F. O. DESCHAMPS.
Turnstile Register.

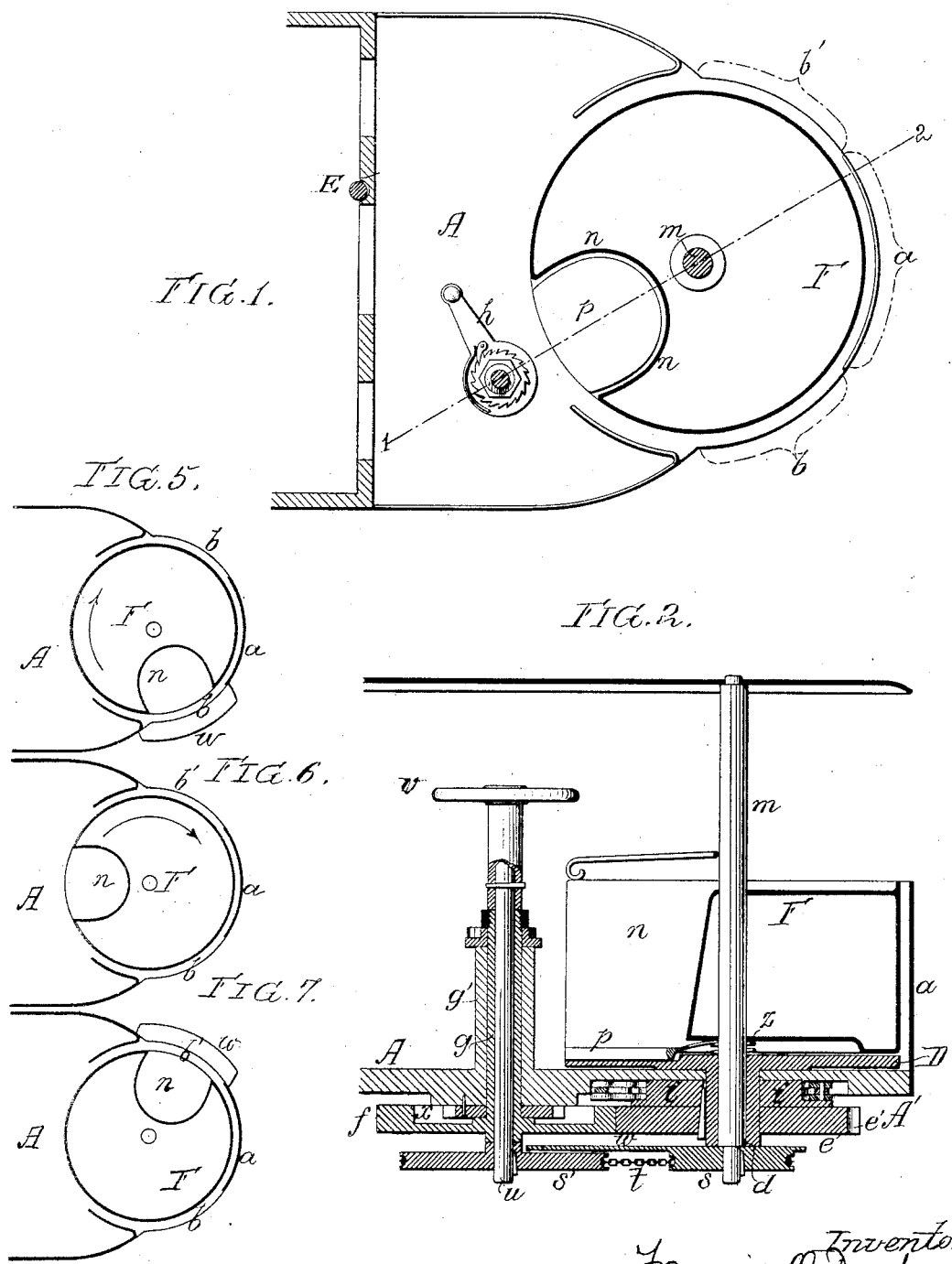

No. 212,906. Patented Mar. 4, 1879.

Witnesses,
Henry Howson Jr.
Harry Smith

Inventor,
Francis O. Deschamps
by his Attorneys
Howson and Son

UNITED STATES PATENT OFFICE.

FRANCIS O. DESCHAMPS, OF PHILADELPHIA, PENNSYLVANIA.

IMPROVEMENT IN TURNSTILE-REGISTERS.

Specification forming part of Letters Patent No. 212,906, dated March 4, 1879; application filed August 10, 1878.

*To all whom it may concern:*

Be it known that I, FRANCIS O. DESCHAMPS, of Philadelphia, Pennsylvania, have invented a new and useful Improvement in Registering Devices for Street-Cars, &c., of which the following is a specification:

The object of my invention is to construct an accurate registering device for street-cars, public halls, &c., which device will be entirely under the control of the conductor or other authorized person; and this object I attain in the manner which I will now proceed to describe, reference being had to the accompanying drawings, in which—

Figure 3:
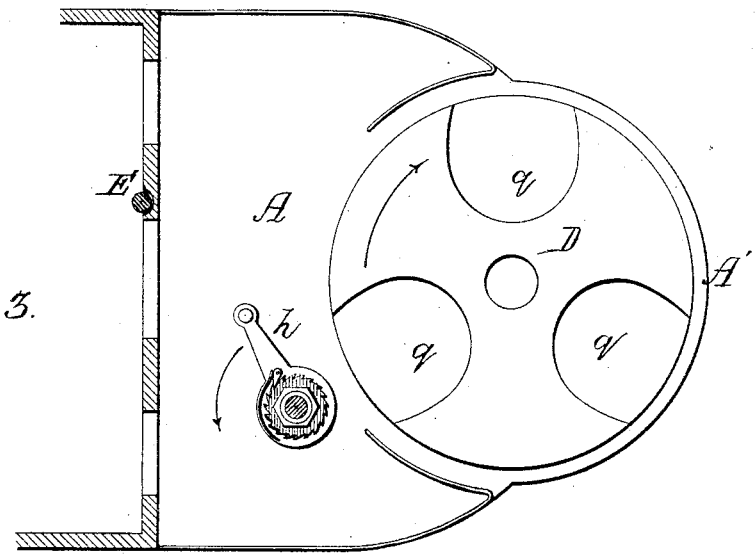
Figure 4:
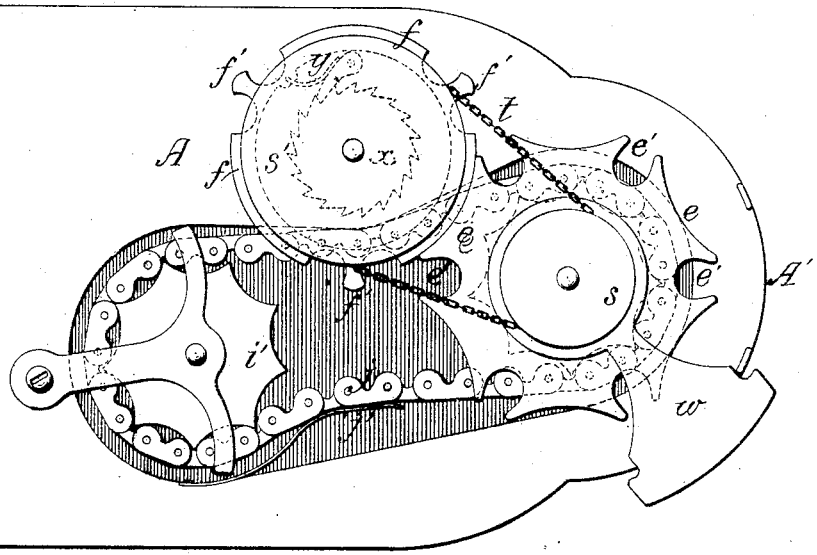

Figure 1, Sheet 1, is a sectional plan view of the platform of a street-car with my improved registering apparatus applied thereto; Fig. 2, a vertical section on the line 1 2; Fig. 3, Sheet 2, a view similar to Fig. 1, with part of the apparatus removed; Fig. 4, an inverted plan view of the device; and Figs. 5, 6, and 7, Sheet 1, diagrams illustrating its operation.

A is the rear platform of the car, which is closed at the sides, and has a rearward extension, A', the latter being inclosed at the rear end, $a$, only, so as to leave at one side an entrance-opening, $b$, and at the other side an exit-opening, $b'$.

To an opening in the extension A' of the platform is adapted the tubular shaft $d$ of a turn-table, D, the latter resting on suitable bearings on the platform, so as to turn freely thereon.

To the shaft $d$ is secured a disk, $e$, which has in the edge recesses $e'$, adapted for the reception of lugs $f'$ on a disk, $f$, secured to the lower end of a tubular shaft, $g$, which is adapted to a vertical bearing or post, $g'$, on the platform A, as shown in Fig. 2.

The disks $e$ and $f$ are, by means of the lugs $f'$ and recesses $e'$, geared together, so as to move in unison, in a manner fully set forth in a separate application which I have made for a patent.

The shaft $g$ has at the upper end a hand-lever, $h$, and pawl and ratchet, by means of which the conductor or other authorized person can turn the shaft $g$, and thereby, through the medium of the disks $e$ and $f$, move the turn-table D in the direction of the arrow.

The shaft $d$ of the turn-table carries a chain-wheel, $i$, round which and round a similar wheel, $i'$, at the lower end of a register-operating shaft, E, placed inside the car, passes a chain-belt, $j$, the latter being kept under proper tension, so as to prevent loss of motion, by a spring, $j'$.

Through the hollow shaft $d$ passes a spindle, $m$, to which is secured a turret, F, the latter being arranged immediately above the turn-table D, and having formed in it a recess, $n$, at the bottom of which is a yielding platform, $p$, which, when depressed, rests in one of a series of depressions, $q$, formed in the top of the turn-table. (See Figs. 2 and 3.)

The lower end of the spindle $m$ carries a chain-pulley, $s$, round which passes a chain-belt, $t$, which also passes round a pulley, $s'$, on the lower end of a spindle, $u$, adapted to the hollow shaft $g$, and provided at the top with a hand-wheel, $v$.

Secured to or forming part of the pulley $s$ is a projecting plate, $w$, which is arranged immediately beneath the recess $n$ of the turret F, and moves with said turret, so that when the latter is moved until the recess coincides with either of the openings, $b$ or $b'$, in the casing of the platform, the plate $w$ projects beyond the platform at such point, so as to form a step.

Secured to the under side of the platform A is a ratchet-wheel, $x$, with which engages a pawl, $y$, carried by the disk $f$, this ratchet and pawl serving to prevent movement of the disks $e$ and $f$ and turn-table D in any other than one direction.

The operation of the apparatus is as follows: The turret when in its normal position is as shown in Fig. 5—that is, with the opening or recess $n$ and the step $w$ coinciding with the opening $b$.

A passenger, on entering the opening or recess of the turret, depresses the platform $p$ into one of the recesses $q$ of the turn-table, so that the turn-table and turret are firmly locked together, and cannot turn independently of each other.

The conductor operates the hand-lever $h$ so as to move the turn-table and turret in the direction of the arrow to the position shown in Fig. 6, when the passenger can step from the turret onto the platform and enter the car. This movement of the turn-table and turret is transmitted by the chain-belt and gearing to the shaft E of the registering apparatus, and is thereby properly recorded.

Should a passenger desire to leave the car, the recess n of the turret is entered from the platform, and the turn-table and turret moved in the direction of the arrow by the hand-lever h and intermediate gearing to the position shown in Fig. 7—that is to say, until the recess n and step w coincide with the opening b'. This motion is likewise transmitted to the registering apparatus, so that one-half of the number indicated by the latter will indicate the number of passengers carried.

The adjustment of the empty turret to the proper position for receiving an entering or departing passenger is effected by means of the hand-wheel v and gearing connected with the same, the yielding platform p in this case slipping from one of the recesses q of the turn-table to another without imparting any movement to said turn-table, and consequently without causing any operation of the registering apparatus.

It will be observed in Fig. 2 that a spring, z, is interposed between the turret F and the turn-table, so that while the weight of the turret itself is supported clear of the turn-table, and said turret can, under ordinary circumstances, be freely turned, any attempt to enter the car fraudulently by resting upon the turret without depressing the platform p will be defeated, as the additional weight upon the turret will depress the same and bring it into frictional contact with the turn-table, so that one cannot turn without the other.

Although I prefer to construct the apparatus as shown in the drawings, such construction is not absolutely necessary in every case. For instance, the turret might form part of the turn-table, the latter being arranged to register when it is turned in one direction, but not when it is turned in the other.

The device is also applicable to other doorways and entrances than those of street-cars.

I claim as my invention—

1. The combination of a floor or platform, a partly-inclosed turn-table, and devices, substantially as described, whereby the said turn-table may be rotated or partly rotated, all substantially as and for the purpose herein set forth.

2. The combination of a turn-table, a turret independent of but capable of being locked to said turn-table, and devices whereby the turn-table and turret may be operated independently of each other, as specified.

3. The combination of the turn-table D with the turret F, arranged above the said turn-table, and resting upon a yielding support, as set forth.

4. The combination of the turn-table D, having depressions q, the turret F, having a recess, n, and yielding platform p, and devices for rotating or partially rotating said turret.

5. The combination of the platform A', the turret F, having a recess, n, the step w, and devices for moving said step and turret in unison, as set forth.

6. The combination of the operating-shaft g, the turn-table shaft d, and the registering-apparatus shaft E, geared together so as to operate in unison, as specified.

7. The combination of the shaft d and its pulley i, the shaft E and its pulley i', the belt j, and the spring j', as set forth.

In testimony whereof I have signed my name to this specification in the presence of two subscribing witnesses.

FRANCIS O. DESCHAMPS.

Witnesses:
  HENRY HOWSON, Jr.,
  HARRY SMITH.